Aug. 8, 1933.

W. J. JOHNSON ET AL
CHAIR BACK OR REST

Original Filed July 14, 1927

Re. 18,913
3 Sheets-Sheet 1

Inventors,
Walter J. Johnson
Arthur L. Johnson

By Young & Young

Attorneys.

Aug. 8, 1933.

W. J. JOHNSON ET AL
CHAIR BACK OR REST

Re. 18,913

Original Filed July 14, 1927 3 Sheets-Sheet 2

Inventors
W. J. Johnson
A. L. Johnson
By
Their Attorneys

Aug. 8, 1933.

W. J. JOHNSON ET AL
CHAIR BACK OR REST

Re. 18,913

Original Filed July 14, 1927 3 Sheets-Sheet 3

Inventors
W. J. Johnson
A. L. Johnson
By Young & Young
Attorneys.

Reissued Aug. 8, 1933

Re. 18,913

UNITED STATES PATENT OFFICE 18,913

CHAIR BACK OR REST

Walter J. Johnson, Evanston, and Arthur L. Johnson, Oak Park, Ill.

Original No. 1,769,294, dated July 1, 1930, Serial No. 205,701, July 14, 1927. Application for reissue May 5, 1932. Serial No. 609,542

3 Claims. (Cl. 155—157)

This invention relates to chairs in general and particularly to a chair back or rest. More specifically the invention is directed to a chair back or support for use in connection with a stenographer's chair in which there is arranged a lumbar support for the small of the back.

In chairs as heretofore constructed, it is the usual practice to adjustably mount the forked arms or uprights at the back of the chair but the back pad or back member carried by these uprights does not accurately fit the back of the user and when the uprights are adjusted, the angularity of the back is altered in such a manner as to cause discomfort.

This invention is designed to overcome the defects noted above and objects of such invention are to provide a novel form of chair back which is so made that although the uprights may be adjusted, as required, that nevertheless, the chair back will automatically adjust itself to the exact needs of the user.

Another object of the invention is to provide a chair having a back support which is tiltable rearwardly relative to the chair seat and which has a lumbar back rest pivotally connected to the back support so as to bring the back support into proper supporting position relative to the small of the back of a user during occupancy of the chair.

Another object is to provide a lumbar back support or rest which is pivotally connected to a supporting member, the lumbar support or rest being bowed or curved outwardly toward the front of the seat in a vertical plane and curved or bowed outwardly away from the seat in a horizontal plane.

Still another object is to provide a lumbar back rest which is movable vertically relative to the chair seat so as to be adjusted in height to fit the small of the back of a user and which is pivotally connected to an upright supporting member, whether the upright supporting member comprises spaced uprights or a single central upright, so that the rest will tilt upon its horizontal axis to fit against the small of the back of the user during occupancy of the chair.

A further object of this invention is to provide a novel form of chair back which is pivotally carried on the upright or uprights and which automatically returns to an approximately vertical position when the operator leaves his seat, and which instantly adjusts itself to his exact requirements when the chair is again occupied.

Further objects are to provide a novel form of chair back in which contact with any bony portion of the body is wholly avoided and the chair back is so contoured and formed that it fits around the back of the user without binding against any portion of the back bone, but furnishes the requisite support for the back at the small of the back, where it is most needed, and which although provided with a rigid frame, may be so padded and formed that a yielding cushion-like structure is attained.

Embodiments of the invention are shown in the accompanying drawings in which.

Figure 1:
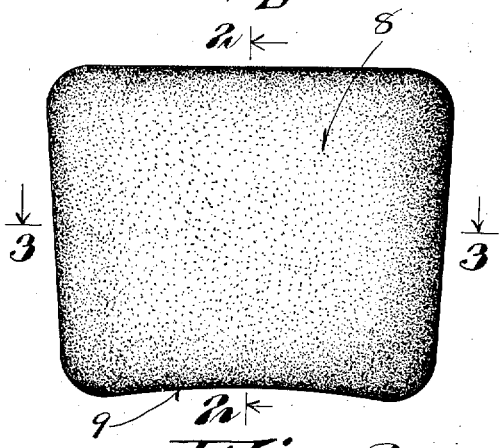
Figure 1 is a front elevation of the chair back.

Referring to the drawings, particularly Figures 1 to 6, it will be seen that the chair back comprises a rigid frame formed of a pair of side members 1, a top 2, and a bottom member 3. It is to be noted particularly from Figure 2, that the bottom member is materially larger and heavier than the top member and that the side members 1 taper towards the bottom member in a gradual manner. This latter construction is shown most clearly in Figure 5, from which it will also be seen that the members are curved, particularly the side members 1, so that they arch outwardly or forwardly, as shown.

Figure 6:
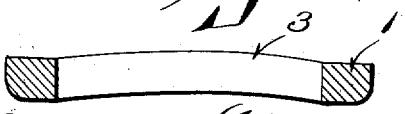
Figure 6 is a sectional view on the line 6—6 of Figure 4.

It is to be noted also that the top and bottom members are inwardly curved, or in other words, are arched rearwardly; for example, the bottom member 3 has been shown in Figure 6 to bring out this construction.

Figure 4:
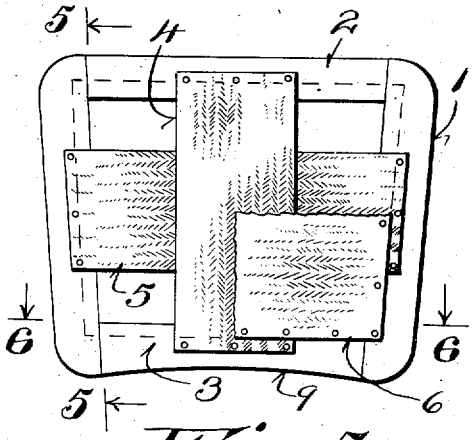
Figure 4 is a view from the front of the chair back with the cover and padding removed and with parts broken away.
Figure 2:
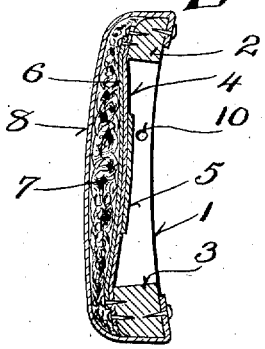
Figure 2 is a sectional view on the line 2—2 of Figure 1.
Figure 3:
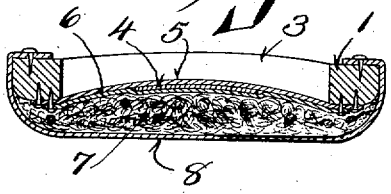
Figure 3 is a sectional view on the line 3—3 of Figure 1.

A pair of cross straps 4 and 5 of inelastic material may be secured to the front face of the marginal frame members, just described, and these inelastic strap members are covered by an inelastic member 6, positioned in front of the inelastic straps, as shown in Figure 4. These inelastic members are freely yielding and when in final position, as shown in Figures 2 and 3, they are bowed rearwardly a slight distance. This bowing is caused by the fibrous or other yielding packing 7, which is interposed between the cover 8 and the members 4, 5, and 6. The flexible cover 8 is wrapped about the margins of the frame and secured in place, as indicated in Figures 2 and 3. This flexible cover and the padding and the inelastic members 4, 5, and 6, cooperate to position the cover 8 substantially straight across, as measured along a horizontal line and shown in Figure 3, and slightly bulged, as measured along a vertical line and shown in Figure 2. The rearward bowing of the inelastic members 4, 5, and 6 prevents any further sagging of these members, as the component of their pull is forwardly and thus a further deflection of them is prevented. In other words, the padding is not interposed with the cover bowed very far outwardly and the back members straight, but is so positioned that the back members are bowed rearwardly and the cover is substantially straight except for a slight bowing as measured along a vertical line and described above.

It is to be noted particularly that the padding 7 or filling, extends between the marginal frame and the cover and gradually tapers outwardly or thins as the side edges of the marginal frame are approached, as is clearly shown in Figures 2 and 3. The thickest portion of the padding is located centrally where it is most needed.

Figure 8:
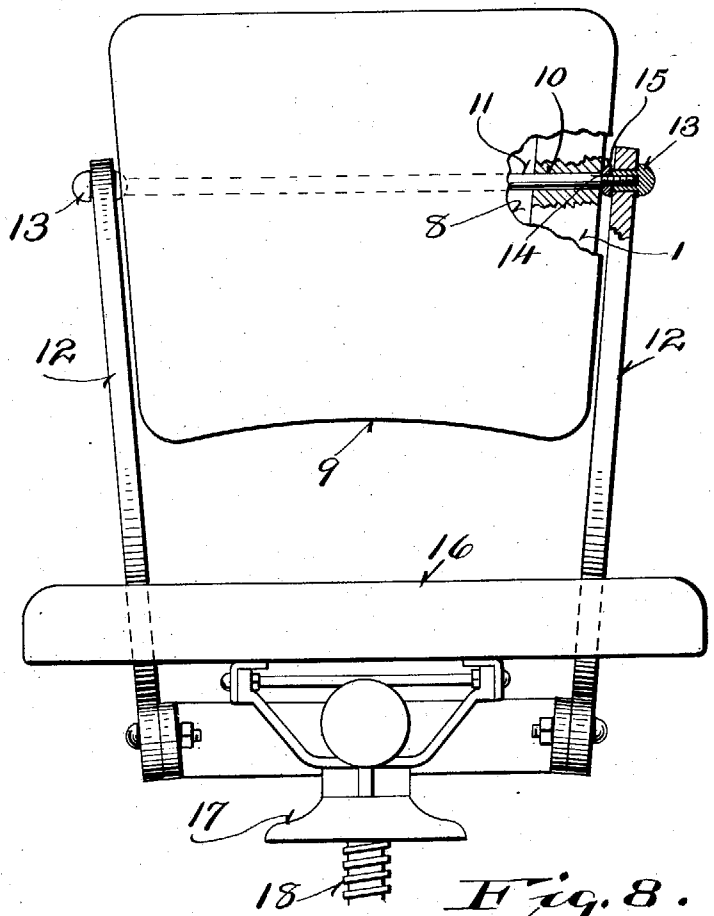
Figure 8 is a front view of the upper portion of the chair with parts broken away.

It is to be noted particularly that the bottom member 3 arches upwardly adjacent its center, as indicated by the reference character 9 in Figure 4, so that the back is provided with an upwardly cut bottom edge and with downwardly extending corners. This form of the back is also shown in Figures 1 and 8, and it is to be noted that the construction is such that the corner portions extend a slight distance around the sides of the operator at the fleshy portion of his back and removed from the spinal column. At the spinal column the back is cut upwardly, as described above, so as to avoid any cutting at this point. In addition to this, the padding interposed between the marginal frame and the cover guards against this undesirable effect.

The net result of this construction is that there is no uncomfortable cutting or binding of the back of the seat against the back of the user, but instead the back of the seat conforms accurately to the small of the back of the user.

Figure 5:
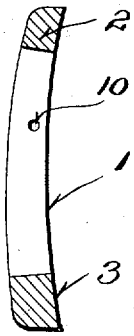
Figure 5 is a sectional view on the line 5—5 of Figure 4.
Figure 7:
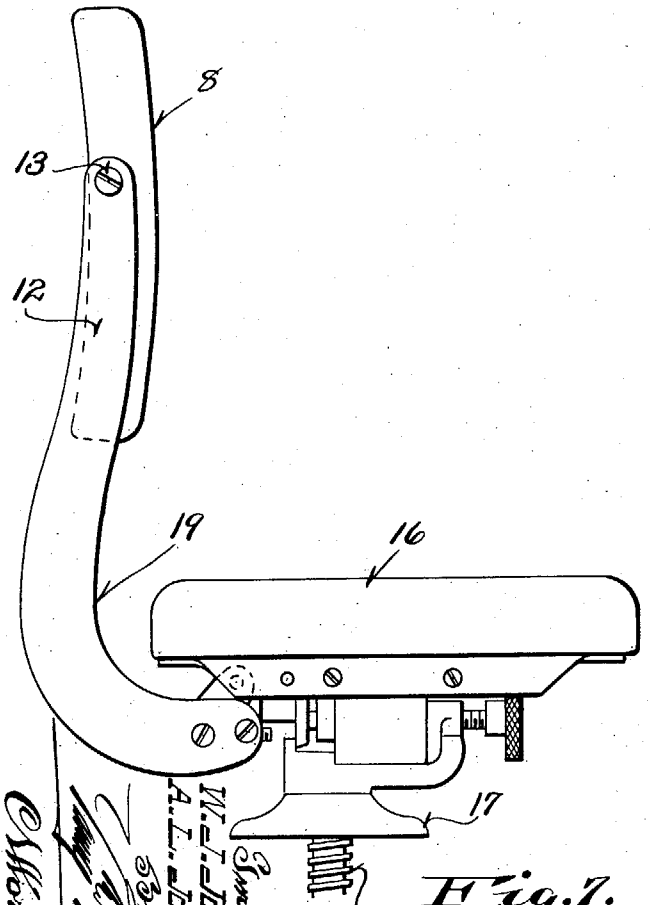
Figure 7 is a side elevation of the upper portion of a chair equipped with the back.

The back, Figures 2 and 5, is provided with a pair of apertures 10 through its side portions 1 and these apertures may be positioned at any point desirable but are herein shown as being located above the center line of the back. The weight of the frame is greater adjacent its bottom portion, bringing the center of gravity at a point spaced a material distance below the axis of the apertures 10. A pivot bar or rod 11, Figures 7 and 8, is passed through these apertures 10 and is carried by a back support comprising the spaced uprights or upwardly extending arms 12. Thus, the back is pivoted about an axis spaced above its center of gravity and is consequently, a full floating back which freely adjusts itself to the exact requirements of the user, always automatically returning to approximately vertical position when the chair is not occupied, so that it is in a position adapted for instant use without any adjustment on the part of the operator.

Various means may be employed for supporting the end of the rod 11. In the form shown in Figure 8, a pair of knobs or sleeves 13 are screwed upon the threaded outer ends of the rod 11, it being noted that such threaded ends are reduced to provide shoulders 14 adjacent the edges of the back of the seat. Further, it is to be noted that a lock nut in the form of a washer 15 is screwed tightly against these shoulders and the sleeve of the bearing member 13 is screwed tightly against the lock nut. Thus, the spacing between the enlarged head of the sleeve or bearing member 13 and the lock nut 15 is fixed and this spacing is slightly greater than the thickness of the uprights 12. Thus, there can be no binding at this portion of the structure and the bearing members 13 freely turn within the apertured portions of the uprights 12. It is preferable to provide each headed portion of the bearing members 13 with a screw driver receiving slot, as shown in Figure 7.

The uprights 12 are adjustable and yieldingly held in any desired position relatively to the seat 16 in any usual or customary manner. The details of this construction have not been shown as it may be conventional. Further, it is desirable to pivotally and yieldingly mount the seat upon the head 17 of the screw 18 in the customary manner.

The uprights 12 are arched rearwardly at the point indicated by the reference character 19 so as to comfortably accommodate the user without any chance of binding against his body, so that the entire forward thrust against the body of the user is borne by the full floating completely padded back. Thus, users of widely differing builds or physiques are accommodated by this self-adjusting type of chair and the utmost comfort is attained.

Figure 9:
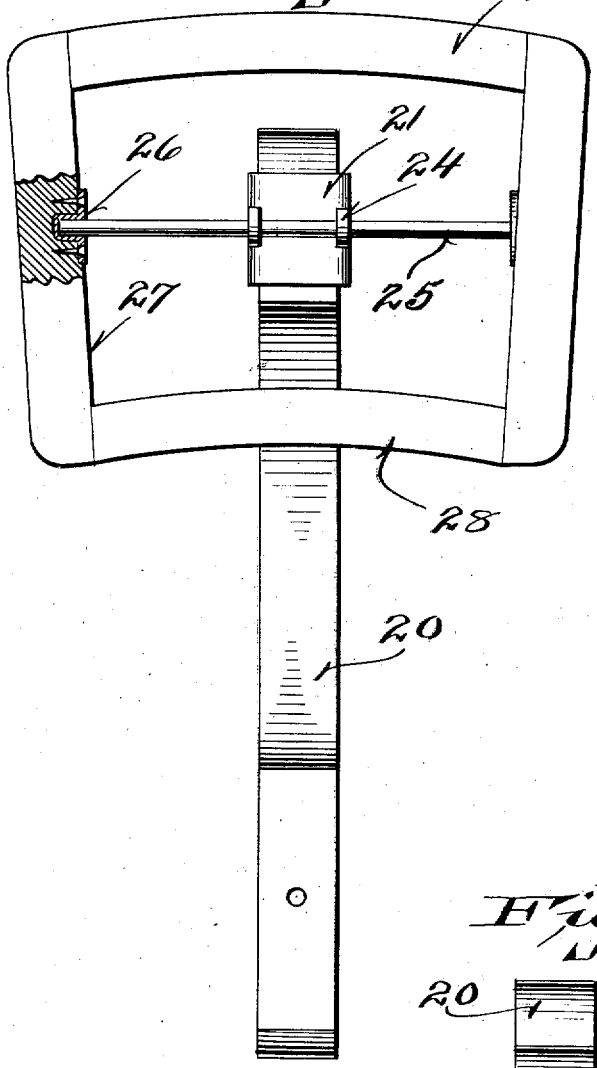
Figure 9 is a view of a modified form of back showing the frame partly in section and the padding and associated flexible sheets removed.
Figure 10:
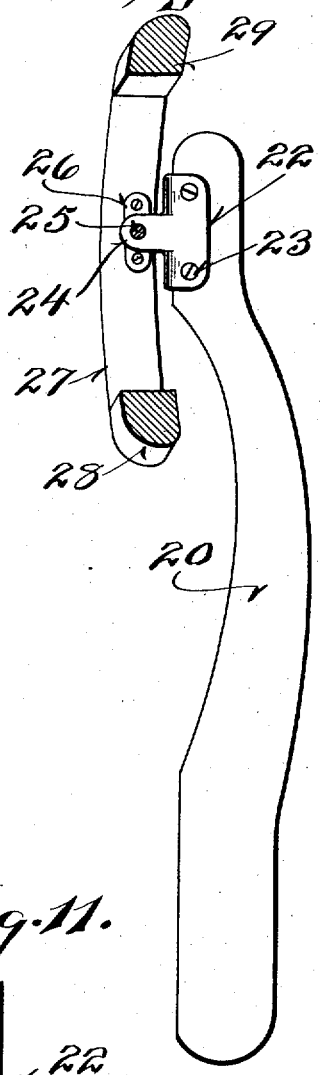
Figure 10 is a sectional view through the back.
Figure 11:
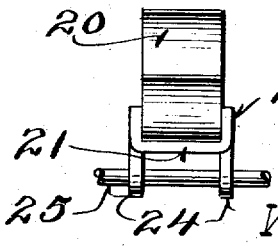
Figure 11 is a fragmentary plan view of the attaching clip carried by the upright.

Referring to the modified form of the invention shown in Figures 9, 10, and 11, it will be seen that the same type of frame is that previously described, may have the back support constituting a single upright 20 instead of a pair of uprights or arms 12. This single upright 20 is positioned centrally of the back and is provided with an attaching clip 21 having inturned tongues or faces 22 which are apertured for the reception of the screws 23, see Figure 10.

Further, it is to be noted that the clip is provided with a pair of forwardly projecting apertured tongues 24 which receive the horizontal pivot rod 25. This rod 25 may be either pivotally carried by the tongues 24 or else may be socketed within the bearing members 26 secured to the sides 27 of the chair back. It is to be noted that the upright 20 is curved, Figure 10, to provide room for the swinging of the bottom 28 of the frame for the back. The top 29 of the frame can swing over the upper end of the upright 20. It is apparent that by having the rod 20 rigidly carried by the tongues 24 that lateral shifting of the back cannot occur. The members 26 are inset in apertures formed in the sides 27, as shown, and are provided with projecting feet through which screws or tacks pass, as shown in Figure 10. The back or lumbar rest, Figures 9 and 10, comprises a frame having spaced side members 27 and bottom and top members 28 and 29 respectively. The bottom and top members are curved outwardly, that is, away from the seat, in a horizontal plane but bow inwardly toward the chair seat in a vertical plane. The side members 27 conform with the general contour of the bottom and top, that is, the side members at their upper and lower ends merge with or become flush with these two members and bow inwardly toward the seat, as clearly shown in Figure 10.

It will be seen that a full floating automatically adjusting back has been provided which is formed in a novel manner and which wholly avoids any possibility of cutting or other discomfort to the user.

The invention provides an exceedingly comfortable chair having an upright back support to which a lumbar back rest is pivotally connected. The back support, whether it constitutes the spaced uprights 12 or a single upright 20, is tiltable rearwardly relative to the seat, that is, the back support moves away from the seat when pressure is applied thereagainst and returns to normal vertical position by springs. The back rest is bowed outwardly in a horizontal plane and bowed inwardly in a vertical plane so as to fit the small of the back of an occupant. This back rest is pivotally connected to the back support and pivots about a horizontal axis, thereby adjusting itself to the position of the occupant.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. A back construction for a chair comprising a rigid marginal frame having a top, side members, and an upwardly and rearwardly curved bottom member, said bottom member being larger than said top, said side members being tapered and being forwardly arched, an inelastic backing member secured to said frame on its front face and being rearwardly bowed, a flexible front cover wrapped around the edges of said frame and secured thereto, and a yielding padding interposed between said backing member and said cover and between said frame and said cover, said padding being thickest adjacent the center of the back and gradually thinning at the edges of said frame, the said cover being substantially straight along horizontal lines adjacent its center and being slightly bowed forwardly along vertical lines.

2. In chair construction, a back comprising a rigid marginal frame having a top, side members and bottom member, said side members being tapered and forwardly arched, means for pivotally mounting the frame with its pivoted axis located above its center of gravity, an inelastic backing member secured to said frame on it front face and being rearwardly bowed, a flexible front cover wrapped around the edges of said frame and secured thereto and a yielding padding interposed between said backing member and said cover and between said frame and said cover, said padding being thickest adjacent the center of the back and gradually thinning out the edges of said frame, the said cover being substantially straight along lines adjacent its center and being slightly bowed along vertical lines.

3. The combination of a chair having a seat, a support fastened to the underside of the seat, upright supporting means fastened to the support by a pivot beneath the seat whereby the supporting means is pivotally mounted in respect to the seat and yieldingly mounted relative to the seat so as to yield rearwardly with respect to said seat, and a lumbar back rest pivoted about a horizontal axis and connected to the upright supporting means, said back rest being free to pivot on its axis in a vertical arc on each side of a plane perpendicular to the seat whereby to provide a floating back for said chair adapted to support the back of a person sitting in said chair in all sitting postures.

WALTER J. JOHNSON.
ARTHUR L. JOHNSON.